Figure 1:
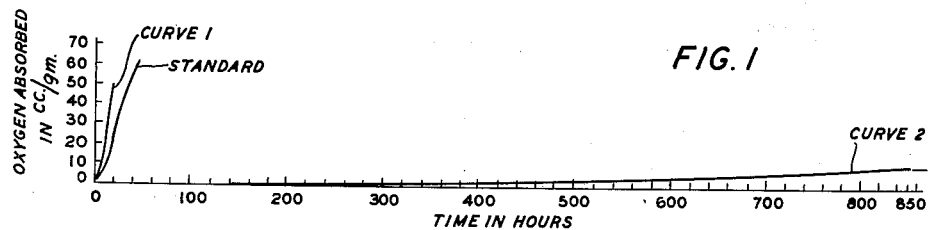

Jan. 10, 1961    W. L. HAWKINS ET AL    2,967,849

STABILIZED STRAIGHT CHAIN HYDROCARBONS

Filed Nov. 29, 1956

INVENTORS   W. L. HAWKINS
V. L. LANZA
F. H. WINSLOW

BY

ATTORNEY

United States Patent Office 2,967,849
Patented Jan. 10, 1961

2,967,849

STABILIZED STRAIGHT CHAIN HYDROCARBONS

Walter L. Hawkins, Montclair, Vincent L. Lanza, Summit, and Field H. Winslow, Springdale, N.J., assignors to Bell Telephone Laboratories, Incorporated, New York, N.Y., a corporation of New York Filed Nov. 29, 1956, Ser. No. 625,110

10 Claims. (Cl. 260—41)

This invention relates to the stabilization of polymeric materials against oxidation by the inclusion therein of small amounts of retarder and to highly stabilized products so produced. This invention is primarily directed to such processes and products in which protection against oxidation taking place under the influence of ultraviolet radiation is imparted to the polymeric material by the additional inclusion therein of finely dispersed particles of carbon.

The oxidative mechanism against which protection is afforded in accordance with this invention takes place only in essentially saturated hydrocarbon polymeric materials containing tertiary hydrogen atoms and this invention is therefore restricted to compositions containing such polymeric materials. Polymers containing tertiary hydrogen atoms are of two types; those containing random numbers and spacing of tertiary hydrogen atoms such as polyethylene and those containing ordered hydrogen atoms such as polypropylene. This invention is concerned with either category of polymers containing tertiary hydrogen atoms and also with copolymers and mixtures both of which contain at least one such polymer. Examples of polymers included in this invention in addition to those named are polymers of butene-1,3-methyl butene-1, 4-methyl pentene-1, 4,4-dimethyl pentene 1, dodecene 1 and 3-methyl pentene-1.

Some of the polymers under consideration may have as few tertiary hydrogen atoms as one for every hundred carbon atoms while others such as polypropylene may have as many as one tertiary hydrogen atom for every two carbon atoms. Although the most common polymeric materials falling within the class above outlined are the polymerization products of monomers containing four or fewer carbon atoms, polymerized products of higher order monomers may also be stabilized in accordance with this invention providing they contain tertiary hydrogen atoms as may copolymers and mixtures containing such polymers. For a discussion of the oxidative mechanism against which protection is imparted in accordance with this invention, see Modern Plastics, volume 31, pages 121 to 124, September 1953.

Some of the polymeric materials included in the class above set forth have already attained considerable commercial importance; notably, the various types of polyethylene. Some of the other materials in this class have excellent electrical and mechanical properties and will doubtless find widespread use in the near future.

Many of the most important applications of polyethylene such as its use in cable sheathings, depend on its very good mechanical properties such as high tensile strength and abrasion resistance coupled with its repellent properties against water and water vapor. Other uses take advantage of its high dielectric strength in applications such as primary insulation of wire conductors.

Unfortunately, however, polymeric materials such as polyethylene and the others listed are subject to deterioration from sunlight and heat both of which induce oxidation of the long chain polymeric structure and thereby impair tensile strength, low temperature brittleness and dielectric properties. Oxidative deterioration which is independent of ultraviolet is here referred to as "thermal oxidation" and as the term implies, the effect is substantially accelerated by an increase in temperature.

It was discovered some time ago by workers in the field that effects due to ultraviolet absorption could be effectively avoided by the incorporation into the polymer of small amounts of finely dispersed particles of carbon black. Effective light shielding from ultraviolet emission is afforded by the incorporation into the polymer of from about .05 percent to about 5 percent by weight, and usually about 3 percent, of carbon black particles of the order of somewhat less than 1000 angstroms in size. Many types of carbon black are commercially available for this purpose and their use is widespread. Any such materials are effective in combination with the retarders of this invention in producing a stabilized polymeric product.

The deleterious degradative effect of thermal oxidation on polymers such as polyethylene and polypropylene have also received considerable attention by researchers in the field. Effective "antioxidants" developed for this purpose are generally secondary amines of aromatic compounds which may, in addition to the amino grouping, contain as an additional ring substituent a branched or normal aliphatic radical generally containing three or more carbon atoms. As is well known, a general requirement of such antioxidants is that they contain an antioxidant group such as the secondary amino group attached to an aromatic ring, and that it have such a structure that its resulting radical is stabilized by resonance energy. Much consideration has been given such antioxidants in the texts, see, for example, G. W. Wheland's "Advanced Organic Chemistry," 2nd edition, chapters 9 and 10.

However, even though it has been known for some time that ultraviolet degradation may be effectively prevented by the use of a dispersion of carbon black particles and even though thermal oxidative degradation may be avoided by the use of any of several antioxidants commercially available for this purpose, a further difficulty has been encountered in attempts to prepare polymeric compositions which are at the same time stabilized against both influences. In view of the knowledge that certain carbon blacks when incorporated into essentially saturated hydrocarbon polymers have a mild antioxidant effect in addition to shielding the substance against ultraviolet radiation, it was expected that the incorporation of known antioxidants into polymeric materials containing such carbon blacks would result in increased stability against thermal oxidation. It was discovered however, that, not only is the effect of the presence of such antioxidants and carbon black in the polymer not additive, but that the effectiveness of the antioxidant in the presence of carbon black is reduced several fold, and in many instances is rendered completely ineffectual in that such a product has no more resistance against thermal oxidative degradation than does a sample containing no thermal antioxidant whatever.

In accordance with the disclosure herein, we have discovered a class of material which, when combined with carbon black in polymeric materials such as polyethylene, results in a stabilized product which compares favorably with polymeric materials in which have been incorporated the most effective commercially available antioxidants and which contain no carbon black. These materials which are for the most part completely ineffectual in the absence of carbon black appear to owe their effectiveness to a different mechanism than that of the commercially available antioxidants.

The retarder materials of this invention are all cyclic thiols falling within the general formula R—SH in which R is a ring structure such, for example, as phenyl, naphthyl, anthryl, thiazole or other aromatic or heterocyclic group. The cyclic nucleus of these compounds may additionally contain one or more substituents providing that the total maximum number of carbon atoms in the entire molecule is thirty. Retarders herein also include dimers and higher order polymers containing two or more of the R—SH units. Such materials may be synthesized by iodine titration or other oxidation of aryl dithiols such for example as dithiohydroquinone. In accordance with our discovery, protection is afforded essentially saturated hydrocarbon polymers such as polyethylene by compounds falling within the general formula above only when the product contains carbon black with the exception noted in the next paragraph.

Examples of retarders within the scope of this invention are:

o-Mercaptoethylbenzene
m-Mercaptoethylbenzene
p-Mercaptoethylbenzene
Mercapto-n-propylbenzene (o, m, p)
Mercapto-iso-propylbenzene (o, m, p)
Mercapto-n-butylbenzene (o, m, p)
Mercapto-iso-butylbenzene (o, m, p)
Mercapto-secondary-butylbenzene (o, m, p)
Mercapto-tertiary-butylbenzene (o, m, p)
1-mercaptonaphthalene
o-1-mercaptomethylnaphthalene
m-1-mercaptomethylnaphthalene
p-1-mercaptomethylnaphthalene
o-1-mercaptoethylnaphthalene
m-1-mercaptoethylnaphthalene
p-1-mercaptoethylnaphthalene
1-mercapto-n-propylnaphthalene (o, m, p)
1-mercapto-iso-propylnaphthalene (o, m, p)
1-mercapto-n-butylnaphthalene (o, m, p)
1-mercapto-iso-butylnaphthalene (o, m, p)
1-mercapto-secondary-butylnaphthalene (o, m, p)
1-mercapto-tertiary-butylnaphthalene (o, m, p)
o-2-mercaptomethylnaphthalene
m-2-mercaptomethylnaphthalene
p-2-mercaptomethylnaphthalene
o-2-mercaptoethylynaphthalene
m-2-mercaptoethylnaphthalene
p-2-mercaptoethylnaphthalene
2-mercapto-n-propylnaphthalene (o, m, p)
2-mercapto-iso-propylnaphthalene (o, m, p)
2-mercapto-n-butylnaphthalene (o, m, p)
2-mercapto-iso-butylnaphthalene (o, m, p)
2-mercapto-secondary-butylnaphthalene (o, m, p)
2-mercapto-tertiary-butylnaphthalene (o, m, p)
1-mercaptoanthracene
2-mercaptoanthracene
2-mercaptobenzoxazole
2-mercaptobenzothiozole The retarders of this invention may or may not contain ring substituents as above limited other than those described. Although the basic retarder action herein described is obtained only in the presence of carbon black, the unsubstituted compounds imparting no protective qualities to clear polyethylene, an additional antioxidant action similar to that obtained by use of any of the commerically available antioxidants may be obtained by introducing onto the aromatic ring, antioxidant groups such, for example, as one or more hydroxyl or secondary amine radicals. As is well known to those versed in the art, effective antioxidant action would be additionally dependent upon the presence of a blocking influence furnishing steric hindrance to the compound so formed so as to prevent the antioxidant grouping from being oxidized too readily and to assure a reasonable protective life. Whereas, in the instance of a fused ring structure such as hydroxylated thionaphthol the second ring may adequately hinder the hydroxyl radical to the extent required, in the instance of thiols of single ring compounds containing as a ring substituent a hydroxyl or other antioxidant grouping, a second ring substituent, such for example, as a tertiary-butyl radical may be added in accordance with conventional practice.

Figure 2:
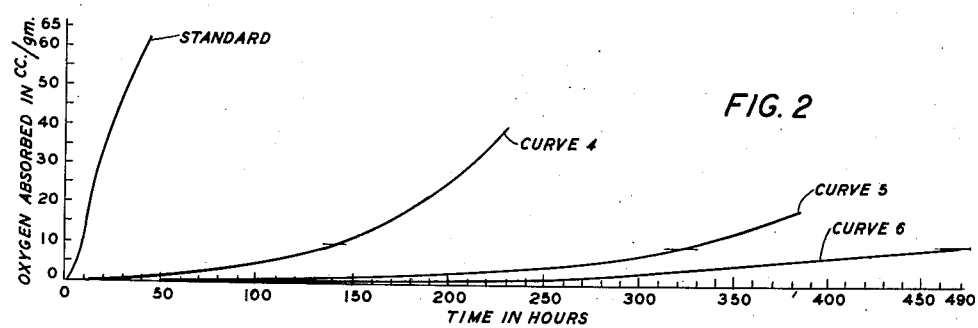
Figure 3:
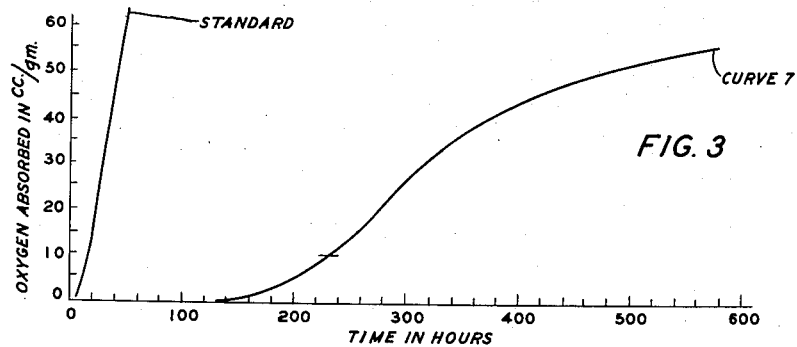
Figure 4:
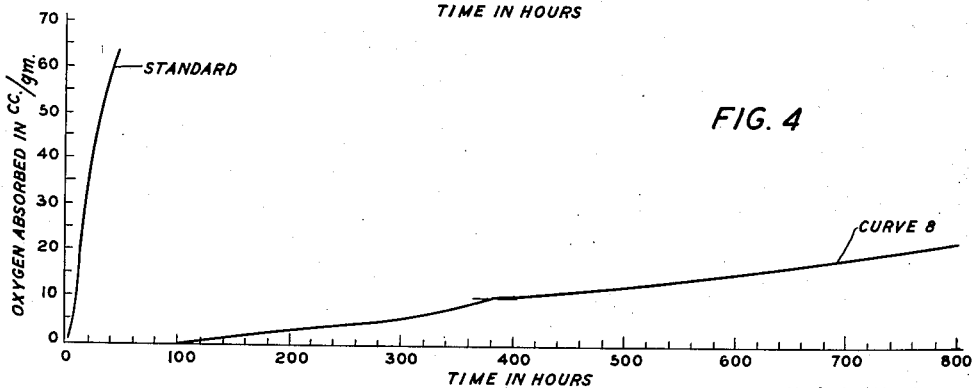

The advantages gained by use of compositions of this invention will be appreciated by reference to the figures which, on coordinates of oxygen uptake against time in hours, is plotted from data taken from accelerated oxidation tests made on polyethylene samples as follows:

Fig. 1 contains three curves on these coordinates, one for polyethylene containing no additives, a second for polyethylene containing thio-beta-naphthol and a third for polyethylene containing both thio-beta-naphthol and dispersed carbon black particles;

Fig. 2 contains four curves; one for polyethylene containing no additives, a second for polyethylene containing p-toluene thiol together with dispersed carbon black particles, a third for polyethylene containing m-toluene thiol and dispersed carbon black particles, and a fourth for polyethylene containing o-toluene thiol together with dispersed carbon black particles;

Fig. 3 contains two curves, one for polyethylene containing no additives and a second for polyethylene containing 2-mercaptobenzoxazole together with dispersed carbon particles; and Fig. 4 contains two curves, one for polyethylene containing no additives and one for the same polymer containing 2-mercaptobenzothiazole together with dispersed carbon black particles.

The figures presented are representative of data taken from a standard accelerated aging test for polyethylene. Such tests are well known and data taken therefrom is of known significance. To aid in the description of this figure, an outline of the accelerated testing procedure used is set forth below.

*Accelerated test procedure*

The saturated hydrocarbon polymer which in all of the tests for which data is reported on the accompanying figure was polyethylene, together with a retarder as reported herein and carbon black where required was prepared by mill massing on a 6-inch by 12-inch two-roll mill having roll speeds of approximately 25 and 35 r.p.m. with the rolls at a temperature of about 120° C. The polyethylene used in these studies was a commercial, high-molecular weight, high-pressure polymer supplied by the Bakelite Company as DYNK. This particular polymeric product finds widespread use in industry in such applications as cable sheathing and primary conductor insulation. Where carbon black was to be included, a master batch of polyethylene and 25 percent by weight of carbon black was first prepared by milling, after which the concentration of carbon black was cut back to about 3 percent by dilution with additional polyethylene. This procedure was followed to insure good dispersion of the carbon black throughout the polymer. In instances where the melting point of the retarder under study was above 255° F., the master batch also contained an amount of such retarder in excess of the amount to be tested. In such instances, the excess of retarder was proportionally equal to the excess of carbon black so that the amounts of both additives could be reduced to the desired levels by the addition of polyethylene. Where the melting point of the retarder was below 255° F., it was added directly in the desired concentration to the diluted mix which already contained the desired amount of carbon black, special care being taken to avoid loss of retarder by evaporation.

Test sheets of the polymeric material containing both the retarder and the carbon black were molded to a thickness of approximately 50 mils, and 14-millimeter diameter disks were cut from these sheets. Four such disks, each in a shallow glass cup, were placed in a Pyrex glass tube attached to a mercury manometer together with about 2 grams of powdered barium oxide or similar absorbent. The reaction vessel, after being successively evacuated and filled with oxygen to assure a complete oxygen environment, was again filled with oxygen and was placed in an air-circulating strip-heater oven maintained at 140° C. and of such design as to assure a variation of no more than 1° C. throughout the entire volume in the oven. The reaction vessel was immediately connected to an oxygen gas burette with a short length of polyvinyl chloride tubing. After reaching temperature equilibrium at the said temperature of about 140° C., the system was adjusted to zero reading at atmospheric pressure. Readings of oxygen uptake were made as required at atmospheric pressure, one such reading being taken every 4 to 12 hours.

In referring to curves such as those contained in Figs. 1 through 4, it is here assumed that the useful properties of polyethylene, polypropylene and other essentially saturated hydrocarbon polymers containing tertiary hydrogen atoms are critically affected only after absorbing of the order of 0.5 percent by weight of oxygen. In terms of the ordinate units of the four figures this critical value of 0.5 percent by weight is approximately equivalent to 10 cubic centimeters per gram and reference will be made to this latter value in interpreting the curves contained on these figures.

Referring again to Fig. 1, the "standard" curve corresponds with the sample of polyethylene containing neither retarder material nor carbon black. From this curve it is seen that the unprotected polyethylene had absorbed 10 cubic centimeters of oxygen per gram of polymer after about 8 hours of exposure. From curve 1 which corresponds with the sample of polyethylene containing only 0.1 percent by weight of thio-beta-naphthol and no carbon black, it is seen that little or no protection is afforded the polymer by the retarder, the sample having absorbed 10 cubic centimeters of oxygen after 6 or 7 hours of exposure. No significance is attached to the slight discrepancy between the exposure times for the "standard" curve and curve 1 before absorbing 10 cubic centimeters of oxygen, the samples absorbing oxygen at so rapid a rate that the small difference is attributable to human and/or instrument error.

From curve 2 which corresponds with the sample polyethylene containing both 0.1 percent by weight of thio-beta-naphthol and 3.0 percent by weight of carbon black, it is seen that this combination, by comparison with the other two curves, results in an extremely well stabilized product, the sample having absorbed 10 cubic centimeters of oxygen only after about 850 hours of exposure. As will be recognized by those familiar with data taken from such accelerated tests made on this class of polymeric materials, the stabilization period resulting from the combination of thio-beta-naphthol and carbon black particles (curve 2) compares quite favorably with that resulting from incorporation of the best commercially available antioxidants in polyethylene.

From Fig. 2 it is seen that a combination of any of the toluene thiols together with dispersed carbon black in polyethylene also results in a stable product. Referring to this figure, the curve designated "standard" again has reference to an accelerated test made on a sample of polyethylene containing no additives. After about 8 hours of exposure at 140° C., this sample had absorbed the critical amount, 10 cubic centimeters per gram, of oxygen. Incorporation of 0.1 percent by weight of p-toluene thiol together with 3 percent by weight of carbon black particles in the polyethylene resulted in the data from which curve 4 was plotted. From this curve it is seen that the sample containing both the para compound and carbon black was stabilized for a period of about 140 hours at which time it had absorbed 10 cubic centimeters of oxygen per gram of polymer.

Curve 5 is plotted from data taken from such an accelerated test made on a sample of polyethylene containing 0.1 percent by weight of m-toluene thiol together with 3 percent by weight of dispersed carbon black particles. From curve 5 it is seen that the sample so protected had absorbed 10 cubic centimeters of oxygen per gram of polymer only after about 323 hours of exposure to an oxygen atmosphere at 140° C.

Such an accelerated test made on a sample of polyethylene containing 0.1 percent of o-toluene thiol together with 3 percent of carbon black particles resulted in the data from which curve 6 was plotted. It is seen that the ortho thiol combination with carbon black resulted in a still longer protected period, the sample in this instance having absorbed 10 cubic centimeters of oxygen per gram of polymer only after about 490 hours of exposure.

Although the degree of protection afforded the polymer by a combination of carbon black particles and the three isomers of toluene thiol differs, it should be noted that the characteristic form of curves 4, 5, and 6 is the same, thereby indicating a similar protective mechanism. Although the poorest of the toluene thiols, the para compound, in combination with carbon black when incorporated in the polymer resulted in a protective period of only 140 hours, it should be noted that even such a period is substantially better than that which has been obtained heretofore by use of any of the commercially available secondary-amine type of antioxidants in polyethylene containing carbon black. Although a curve is not included for any of the toluene thiols in polyethylene not containing carbon black, it is expected that little or no protection would be afforded the polymer thereby, the combination being considered to be analogous to that reported for the use of thio-beta-naphthol without carbon black (curve 1, Fig. 1).

Fig. 3 contains two curves, one designated "standard" as in Figs. 1 and 2 for a sample of polyethylene containing no additive and a second, designated curve 7, corresponding with a sample of polyethylene containing 0.1 percent by weight of 2-mercaptobenzoxazole together with 3 percent by weight of dispersed carbon black particles. Comparing the two curves, it is seen that whereas the standard sample had absorbed 10 cubic centimeters of oxygen per gram of polymer after about 8 hours of exposure, incorporation of 2-mercaptobenzoxazole together with carbon black particles in the polyethylene resulted in a sample which had absorbed 10 cubic centimeters of oxygen per gram of polymer only after about 232 hours of exposure under the same conditions.

Fig. 4 contains a standard curve as in the other figures together with curve 8 corresponding with a sample of polyethylene containing 0.1 percent by weight of 2-mercaptobenzothiazole together with 3 percent by weight of dispersed carbon black particles. It is seen that this retarder material, chemically related to the material of Fig. 3, together with carbon black when incorporated in polyethylene resulted in a sample which had absorbed the critical amount of oxygen only after about 380 hours of exposure to an oxygen atmosphere at 140° C. As in the other figures, the control sample curve designated "standard" had absorbed 10 cubic centimeters of oxygen after about 8 hours of exposure under the same conditions.

It will be noted that there is a distinct difference in form between curves 2 through 8 and the type of curve which generally results on such tests run on polymeric samples containing the common commercial antioxidants. In tests run on conventional antioxidants in such polymeric samples there generally results a distinct transition point separating two regions having different oxidation rates. The first portion of a curve plotted from such data, from the origin to the transition point, is interpreted as representing that period over which the antioxidant is protecting the polymer and that portion beyond the transition point is considered to represent the period during which oxidation of the polymer proceeds unhampered due to previous exhaustion of the antioxidant. In contrast, curve 2 of Fig. 1 and the numbered curves of Figs. 2, 3 and 4 manifest fairly constant slope and have no transition point. Such a curve form is characteristic of that group of antioxidants known as retarders. Such materials in combination with a polymer such as polyethylene effect a change in its characteristic oxidation mechanism. Whereas, in the absence of a retarder, oxidation of any part of the polymeric molecule produces a chain reaction with a consequent rapid breakdown of the polymer, the presence of a retarder results in oxidation of the polymer in such manner that an autocatalytic chain reaction is not brought about so that oxidation, although it proceeds, does so at a slower rate thereby resulting in the characteristic form of curves 2 through 8 of Figs. 1 through 4. Furthermore, the fact that curves 2 through 8 do not show a break over so long a period as 140 hours of accelerated test, during which time a large portion of the retarder present would have reacted at least once with the oxygenated radicals, indicates that the reaction might be such as to cause regeneration of the retarder.

A postulated reaction which would explain the above results and which is consistent with known reactions follows:

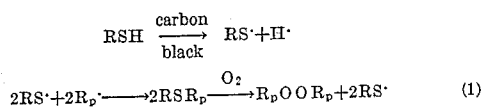

in which $R_p\cdot$ represents the oxygenated polymeric radical. This equation is intended as a general explanation of the reaction which occurs in any essentially saturated polymer such as polyethylene containing one of the retarders of this invention in combination with carbon black.

As the equation indicates, breakdown of the retarder in the presence of carbon black results in the formation of the aromatic sulfide radical which then retards oxidation of the polymeric chain to produce the $$RSR_p \qquad (2)$$

structure which is in turn oxidized to regenerate the aromatic sulfide radical together with the $R_pOOR_p$ type of structure. Apparently this $R_pOOR_p$ compound is fairly stable and does not result in the initiation of a chain reaction such as is normally produced in a polymeric material such as polyethylene in the presence of oxygen.

Why the reaction set forth above does not occur in clear polyethylene is not known although it is postulated that the RS· radical is produced only under the catalytic influence of carbon black. It should be especially noted that the equation above is offered only as a possible explanation of the retarder action in view of the known results, and dependence is in no way had upon it either as a basis for the specification or as substantiation for the claims herein.

As is amply set forth herein, although the invention has been expressed primarily in terms of a specific retarder and a specific amount of carbon black in a specific saturated hydrocarbon polymer containing tertiary hydrogen atoms, a person skilled in the art will recognize that the principles expressed herein are equally applicable to the other retarders and polymers and to the ranges of composition all of which have been set forth. Experimental work carried out using other such materials and the expressed compositional ranges justifies these conclusions.

What is claimed is:

1. A composition which is stabilized against oxidation comprising from 0.5 percent to 5 percent by weight of carbon black particles of a maximum size of 1000 angstroms, from 0.01 percent to 5 percent of a compound of the structure R—SH in which R is a ring structure each containing at least one carbon atom and in which the maximum number of carbon atoms in each of the ring structures including substituents is 30, and an essentially saturated hydrocarbon polymeric material selected from the group consisting of polymers of ethylene, propylene, butene-1, 3-methyl butene-1, 4-methyl pentene-1, 4,4-dimethyl pentene 1, dodecene 1, 3-methyl pentene-1 and mixtures of any of these materials, and in which all weight percents are based on the said composition.

2. The composition of claim 1 in which the polymeric material is a homopolymer.

3. The composition of claim 1 in which the polymeric material is a copolymer.

4. The composition of claim 1 in which the compound is thio-beta-naphthol.

5. The composition of claim 1 in which the compound is an isomer of toluene thiol.

6. The composition of claim 1 in which the compound is 2-mercaptobenzoxazole.

7. The composition of claim 1 in which the compound is 2-mercaptobenzothiazole.

8. The composition of claim 1 in which the polymeric material contains random tertiary hydrogen atoms.

9. The composition of claim 1 in which the polymeric material contains ordered tertiary hydrogen atoms.

10. The composition of claim 1 in which the compound is thio-beta-naphthol and the polymeric material is polyethylene.

References Cited in the file of this patent

UNITED STATES PATENTS

| | | |
|---|---|---|
| 2,431,303 | Billmeyer | Nov. 25, 1947 |
| 2,448,799 | Happoldt et al. | Sept. 7, 1948 |
| 2,512,459 | Hamilton | June 20, 1950 |
| 2,727,879 | Vincent | Dec. 20, 1955 |
| 2,843,577 | Friedlander et al. | July 15, 1958 |

FOREIGN PATENTS

| | | |
|---|---|---|
| 610,129 | Great Britain | Oct. 12, 1948 |

OTHER REFERENCES

Raff: "Polyethylene," 1956, page 402, Interscience Publishers Inc.

Schildknecht: "Polymer Processes," February 28, 1956, page 535. Interscience Publishers Inc.